(12) United States Patent
Ashdown et al.

(10) Patent No.: US 7,505,395 B2
(45) Date of Patent: Mar. 17, 2009

(54) PARALLEL PULSE CODE MODULATION SYSTEM AND METHOD

(75) Inventors: Ian Ashdown, West Vancouver (CA); Alvaro Dau, Victoria (CA)

(73) Assignee: TIR Technology LP, Burnaby (CA)

( * ) Notice: Subject to any disclaimer, the term of this patent is extended or adjusted under 35 U.S.C. 154(b) by 767 days.

(21) Appl. No.: 10/827,897

(22) Filed: Apr. 19, 2004

(65) Prior Publication Data

US 2005/0232132 A1      Oct. 20, 2005

(51) Int. Cl.
  H04L 5/04      (2006.01)
  H04J 7/00      (2006.01)
(52) U.S. Cl. ........................................ 370/205; 370/212
(58) Field of Classification Search .................. 370/205, 370/212, 213; 375/271, 302, 322
  See application file for complete search history.

(56) References Cited

U.S. PATENT DOCUMENTS

| | | | |
|---|---|---|---|
| 2,272,070 A | | 2/1942 | Reeves |
| 3,763,394 A | | 10/1973 | Blanchard |
| 4,090,189 A | | 5/1978 | Fisler |
| 4,845,481 A | | 7/1989 | Havel |
| 4,965,561 A | | 10/1990 | Havel |
| 5,245,355 A | * | 9/1993 | Morton ........................ 347/118 |
| 5,300,960 A | * | 4/1994 | Pham et al. .................. 347/130 |
| 5,923,825 A | * | 7/1999 | Orlicki et al. .............. 358/1.12 |
| 6,281,827 B1 | | 8/2001 | Hsieh |

FOREIGN PATENT DOCUMENTS

WO      02/098182      12/2002

OTHER PUBLICATIONS

"Bus Compatible Digital PWM Controller, IXDP 610", IXYS/DEI, 2001, pp. 1-8.
"MIC 5400: Dual, 8-Output, 14-Bit LED Video Display Driver", Micrel, Inc., (Product Data Sheet), 2002, pp. 1-10.
"48 Output LED Driver/10 Bit PWM Controller", LDT Logic Devise Technology, LD71D1048 (Product Data Sheet), 2003, pp. 1-35.
"Application Brief AB21: Luxeon Product Bining and Labeling", Lumileds Lighting, U.S., LLC, 2003, pp. 1-14.
"FAN5608: Serial/Parallel LED Driver With Current Regulated Step-up DC/DC Converter", Fairchild Semiconductor Corporation, 2003, pp. 1-18.

(Continued)

*Primary Examiner*—Chirag G Shah
*Assistant Examiner*—Srinivasa R Reddivalam

(57)      ABSTRACT

The present invention provides a parallel pulse code modulation system enabling the independent control of a plurality of groups of one or more electronic devices. A memory unit receives control data from an external source, and a multiplexer connected to the memory unit receives control data therefrom and organizes it into a serial data stream. A shift register connected to the multiplexer receives the serial data stream and translates groups of data into parallel data stream output, representing control parameters for a particular group of one or more electronic devices. A latch connected to the shift register and to the groups of electronic devices receives each parallel data stream output and sends a particular parallel data stream output to a corresponding group electronic devices. A logic sequencer provides sequencing and timing signals to the memory unit, the multiplexer, the shift register and the latch.

22 Claims, 5 Drawing Sheets

OTHER PUBLICATIONS

"FAN5611/FAN5612/FAN5613/FAN5614: Low-Dropout LED Drivers for White, Blue or and Colour LED", Fairchild Semiconductor Corporation, 2003, pp. 1-12.

"48 Output LED Driver/9 Bit PWM Controller", SLS System Logic Semiconductor, SL70D0948 (Product Data Sheet), date unknown, pp. 1-17.

"Controlling the Brightness of an LED: Pulse Width Modulation", Microcontroller Beginner Kit Tutorial, Iguana Labs, www.iguanalabs.com/pwm.htm, (printed out Jan. 12, 2004).

"Application Brief AB22: Test Considerations for P3 Series TS AlInGap LED Chips", Luxeon Product Bining and Labeling, San Jose, California, Lumileds Lighting, LLC, 2002, pp. 1-5.

Gase et al, "Optoelectronics Applications Manual", McGraw-Hill Book Company: New York, NY, chapter 2 & 5, 1977.

Howell, "A Brief History of LED Lighting", Artistic License (UK) Ltd., 2002, pp. 1-3.

Howell, "An Overview of the Electronic Drive Techniques for Intensity Control and Colour Mixing of Low Voltage Light Sources Such as LEDs and LEPs", Artistic License (UK) Ltd., London UK, 2002, pp. 1-9.

Howell, "Application Note 008: Frequency Modulation Techniques for the Control of LED Colour Mixing and Intensity", Artistic License (UK) Ltd., London UK, 2002, pp. 1-2.

Zukauskas et al., "Introduction to Solid-State Lighting", Whiley-Interscience, New York, NY, 2002, p. 136.

* cited by examiner

Pulse Width Modulation (PWM)
(a)

Bit Angle Modulation (BAM)
(b)

PARALLEL PULSE CODE MODULATION SYSTEM AND METHOD

FIELD OF THE INVENTION

The present invention pertains to electronic control systems, and in particular relates to a method and apparatus for controlling a multiplicity of light-emitting elements individually or in predetermined groups.

BACKGROUND

Recent advances in the development of semiconductor and organic light-emitting diodes (LEDs and OLEDs) have made these solid-state devices suitable for use in general illumination applications, including architectural, entertainment, and roadway lighting, for example. As such, these devices are becoming increasingly competitive with light sources such as incandescent, fluorescent, and high-intensity discharge lamps.

An advantage of LEDs is that their turn-on and turn-off times are typically less than 100 nanoseconds. The average luminous intensity of an LED can therefore be controlled using a fixed constant-current power supply together with pulse width modulation (PWM) of the LED drive current, wherein the time-averaged luminous intensity is linearly proportional to the PWM duty cycle, as illustrated in FIG. 1, wherein three duty cycles of 25%, 50% and 100% are illustrated. This technique is disclosed in U.S. Pat. No. 4,090,189 and documented in Gage, S., M. Modapp, D. Evans, and H. Sorenson. 1977, *Optoelectronics Applications Manual*, New York, N.Y.: McGraw-Hill Book Company, wherein a single LED colour was considered.

According to W. Howell in a web document "A Brief History of LED Lighting", Middelsex, UK: Artistic License Inc., 2002, J. Laidman developed a commercial product for a company called Sound Chamber that employed a PWM-based controller for a multiplicity of single-colour LEDs in 1979. A similar PWM-based control method and apparatus also employing a multiplicity of single-colour LEDs was later disclosed in U.S. Pat. No. 4,845,481. According to these inventions, an essentially infinite range of colours can be produced by optically blending single colours of different luminous intensities.

Today, PWM is typically the preferred method for LED luminous intensity control in that it offers linear control over a range of three decades (1000:1) or more without suffering power losses through current-limiting resistors, uneven luminous intensities in LED arrays, and noticeable colour shifts (Zukauskas, A., M. S. Schur, and R. Caska, 2002, *Introduction to Solid-State Lighting*. New York, N.Y.: Wiley-Interscience, p. 136). The PWM signals used to control the LEDs are preferably generated by microcontrollers and associated peripheral hardware.

There are however, several practical difficulties with implementing PWM control signals in hardware. For example, most microcontrollers offer one to four dedicated PWM channels on-chip, wherein this is usually adequate for individual light fixtures or luminaires that utilize a multiplicity of LEDs with three or four colours, for example red, green, blue, and occasionally amber, whose luminous intensities must be controlled on a per-colour basis. However, some applications may require more PWM channels to control individual LEDs or groups of LEDs.

One example application that can require this form of control is a luminaire where the individual LEDs may be viewed directly. Current LED manufacturing processes result in individual LEDS that exhibit a wide range of luminous intensities for a given constant drive current. LED manufacturers ameliorate this problem by "binning" or sorting LEDs with similar performance characteristics, including luminous intensity. However, the range of intensities within each bin can typically be 30 percent (e.g., Lumileds Lighting, 2002, *Application Brief AB22—Luxeon Product Binning and Labeling*, San Jose, Calif.: Lumileds Lighting, LLC). Visually critical applications may require a luminaire manufacturer to select LEDs with matching intensity characteristics from within a single bin. Alternatively, the luminaire manufacturer can control the intensity of each LED independently using PWM techniques, however, in this alternative each LED or LED group then requires an independent PWM channel.

Another example application is architectural cove lighting, where a linear array of closely spaced LEDs is used to illuminate a wall adjacent to a ceiling. The length of such an array may range from a few meters to tens of meters. It would be economically advantageous to control the luminous intensities of these LEDs individually or in groups, but with a minimal number of microcontrollers and associated inter-processor communications hardware.

Yet another example application requiring control of individual LEDs or groups thereof occurs when a multiplicity of single-colour LEDs are arranged in a linear array or other geometric pattern wherein it is desired to dynamically change the luminous intensities of individual LEDs or LED groups in order to effect varying patterns of colour and/or luminous intensity. These types of applications can include, for example entertainment lighting systems commonly known as "marquee" or "chase" lighting.

Separate PWM controller integrated circuits (ICs) with up to 48 independent channels that communicate with microcontrollers are commercially available for the above identified purposes. Examples of these ICs include the LD71D1048 PWM controller (Logic Device Technology, 2003, LD71D1048—48 Output LED Driver/10 Bit PWM Controller (Product data sheet)) the MIC5400 LED video display driver (Micrel, Inc. 2002, MIC5400—Dual, 8-Output, 14-Bit LED Video Display Driver (Product data sheet)), and the SL70D0948 PWM controller (System Logic Semiconductor SL70D0948—48 Output LED Driver/9 Bit PWM Controller, (Product data sheet)). Alternatively, it may also be possible to implement a custom PWM controller using field-programmable gate arrays (FPGAs) or application-specific integrated circuits (ASICs) for high-volume production, for example.

These devices have two common problems, however. First, they are physically large devices with up to 128 pins, wherein this feature makes it difficult to route the PWM channel signals to the LED drivers without resorting to, for example expensive multilayer printed circuit boards. And secondly, the devices typically have limited heat dissipation capabilities, which may require additional line drivers for the PWM channel signals if the LEDs are remotely located from the PWM controller.

As an example, PWM control signals can be implemented in firmware using general-purpose microcontrollers. However, the PWM signal frequency should typically be at least 100 Hertz or preferably higher in order to avoid visually perceptible flicker associated with the illumination produced by the LEDs. As such, this requirement typically makes it impractical to implement more than one or two channels on a microcontroller (typically with a CPU clock frequency of 20 MHz) in the absence of a dedicated hardware timer for each channel.

There is therefore a clearly identifiable need for a simple hardware circuit design that can generate a multiplicity of control signals, and which does not require expensive multi-layer circuit boards to route the control signals to the LED drivers.

In the fields of voice and data communications, a well-known alternative to PWM is pulse-code modulation (PCM). This technique was originally developed for voice telephony applications and disclosed in U.S. Pat. No. 2,272,070. In its original form, an analog input signal is regularly sampled and represented by digital code. Unlike PWM however, there is no linear relationship between the average on-time of the digital code and the analog input signal. Consequently, it would appear that there are no apparent advantages to the use of conventional PCM techniques in controlling LED drive currents.

There is however, a variant of PCM that can be considered competitive with PWM for the control of LEDs. In a Web document, "Application Note 011: An Overview of the Electronic Drive Techniques for Intensity Control and Colour Mixing of Low Voltage Light Sources Such As LEDs and LEPs", 2002, W. Howell proposed what he called "bit angle modulation," or BAM. He described this technique as, essentially driving an LED "by a pulse train that is the binary word defining the value of the required intensity. Each bit of the pulse train is stretched by a ratio defined by the binary significance of the bit." Comparative examples of output signals using PWM and BAM are illustrated in FIG. 2, wherein each identifies sixteen discrete signal levels.

Howell noted that BAM is most efficient in terms of microcontroller resources with the following example: "A microprocessor generating an eight-bit resolution PWM signal at 100 Hz will need to process the output every 39 µsec, a total of 256 times per output cycle. By comparison, a microprocessor generating an eight-bit resolution BAM signal at 100 Hz will need to process the output only 8 times at 5000 µsec, 2500 µsec, 1250 µsec, 625 µsec, 312 µsec, 156 µsec, 78 µsec and 39 µsec intervals from the cycle start." He asserted that this represents an 800 percent reduction in required processing power compared to PWM.

As described, BAM can be useful for implementation using microcontrollers that do not have hardware PWM channels, and also communicate with a host controller or perform other tasks in addition to controlling the LED drivers, for example. It does not however address the problems of independently controlling a multiplicity of LEDs with a single microcontroller. While it is true that a firmware BAM implementation requires much less processing power than would an equivalent PWM implementation, the microcontroller must still respond to a hardware timer whose shortest duration pulse was 39 µsec in Howell's example. Assuming a typical microcontroller instruction cycle time of 200 nsec (using a 20 MHz clock), it would be difficult to control more than 20 or so independent BAM channels.

In addition, having regard to Howell's example it appears somewhat optimistic, as most LED drivers for lighting applications require ten-bit resolution at 200 Hz in order to avoid visually perceptible flicker when dimming LED intensities. This typical requirement therefore reduces the minimum BAM pulse width to 5 µsec, and the number of BAM channels to perhaps four for the same 20 MHz clock. (This assumes that the microcontroller needs to devote most of its processing time budget to servicing the hardware timer interrupts and controlling the BAM output signals.)

If for example, a single microcontroller could independently control 128 LED driver channels, it would be desirable to limit the number of physical control lines from the microcontroller to perhaps eight or sixteen, representing one or two eight-bit digital output ports. Therefore, there is a clear need for an apparatus and method that can control a large number of LEDs or group of LEDs wherein physical connections between the source microcontroller and the LED drivers is reduced.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a parallel pulse code modulation system and method. In accordance with an aspect of the present invention, there is provided a parallel pulse code modulation system enabling independent control of a plurality of groups of one or more electronic devices, said system comprising: a memory unit for receiving control data, from an external source, said memory unit configured to enable writing of the control data thereto and reading of the control data therefrom; a multiplexer connected to the memory unit for receiving the control data from the memory unit and organizing the control data into a serial data stream comprising groups of data; a shift register connected to the multiplexer, said shift register receiving the serial data stream from the multiplexer and translating each group of data into a parallel data stream output, each parallel data stream output representing control parameters for a particular group of one or more electronic devices; a latch connected to the shift register and to the plurality of groups of one or more electronic devices, the latch receiving each parallel data stream output and sending a particular parallel data stream output to a corresponding group of one or more electronic devices, thereby providing independent control of the plurality of groups of one or more electronic devices; and a logic sequencer for providing sequencing and timing signals to the memory unit, the multiplexer, the shift register and the latch, thereby controlling actions and timing thereof.

In accordance with another aspect of the present invention there is provided a method for enabling independent control of a plurality of groups of one or more electronic devices, said method comprising the steps of: receiving control data from an external source by a memory unit and writing said control data to said memory unit; reading said control data from the memory unit and transmitting said control data to a multiplexer; organizing said control data into a serial data stream comprising groups of data, by the multiplexer; transforming each group of data into a plurality of parallel data stream outputs, each parallel data stream output representing control parameters for a particular group of one or more electronic devices; transmitting each parallel data stream output to a corresponding group of one or more electronic devices; thereby providing independent control of the plurality of groups of one or more electronic devices.

DETAILED DESCRIPTION OF THE INVENTION

Definitions

Figure 1:
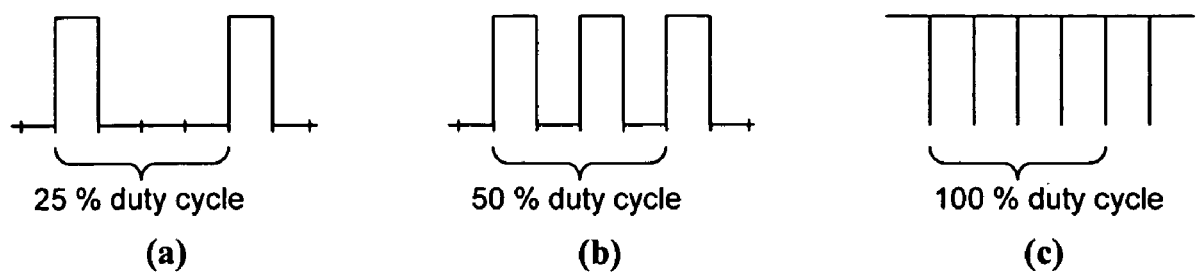
FIG. 1 illustrates an example of pulse width modulation signals for 25%, 50% and 100% duty factor.
Figure 2:
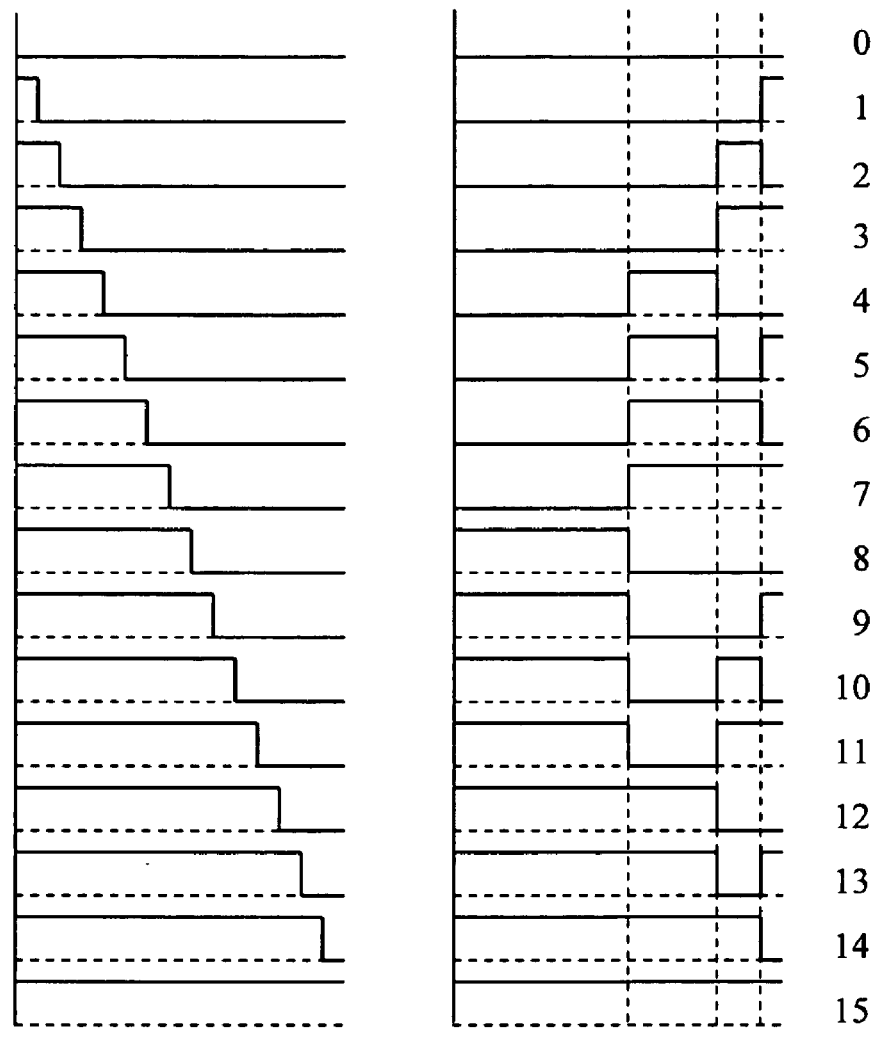
FIG. 2 illustrates an example of pulse width modulation and bit angle modulation signals enabling the creation of 16 distinct output signals for each method.

The term "light-emitting element" is used to define any device that emits radiation in the visible region of the electromagnetic spectrum when a potential difference is applied across it or a current is passed through it, for example, a semiconductor or organic light-emitting diode (LED) or other similar devices as would be readily understood, and may include any electronic circuit drivers that may be needed to control its activation. It would be readily understood by a worker skilled in the art, that a light-emitting element could be replaced by an element, which instead of emitting radiation in the visible region of the electromagnetic spectrum, emits radiation in any region of the electromagnetic spectrum, such as in the infrared or ultraviolet regions.

The term "word" is used to define a plurality of bits of binary data representing a digital signal.

The terms "random access memory" or "RAM" are interchangeably used to define any electronic circuit(s) that forms a memory unit that is a collection of cells together with associated circuits needed to transfer information in and out of the cells. These memory cells can be accessed for information transfer to or from any desired random location of the cells within the memory unit. It would be understood by a worker skilled in the art that any type of memory unit could replace a RAM block.

The terms "first-in-first-out memory" or "FIFO" are interchangeably used to define any electronic circuit(s) that forms a memory unit that can handle oldest program work requests first, therefore the first data written to the memory is the first data read, the second data written is read subsequently, and so on. A FIFO may comprise a plurality of RAM blocks, and read and write address generators which identify the words within the RAM that are being read from or written to the RAM, respectively. It would be understood by a worker skilled in the art that other implementations of a FIFO are possible. For example, a microcontroller with internal or external RAM, or a field-programmable gate array (FPGA) can be programmed to emulate a hardware FIFO.

The terms "multiplexer" or "MUX" are used interchangeably to define any electronic circuit(s) that organizes the data it receives into a serial bit stream of a particular order. The MUX comprises a switch that is used to select and output particular bits of the incoming data in a particular order, and a sequence address generator that identifies which bit or portion of the data is selected by the switch at a given time.

The term "shift register" is used to define any electronic circuit(s) that is capable of accepting a serial data input, shifting the data within itself and outputting this in one or more parallel data streams.

The term "latch" is used to define any electronic circuit(s) that is capable of retaining data it receives and providing it as an output until commanded to receive and retain other data.

Unless defined otherwise, all technical and scientific terms used herein have the same meaning as commonly understood by one of ordinary skill in the art to which this invention belongs.

Figure 3:
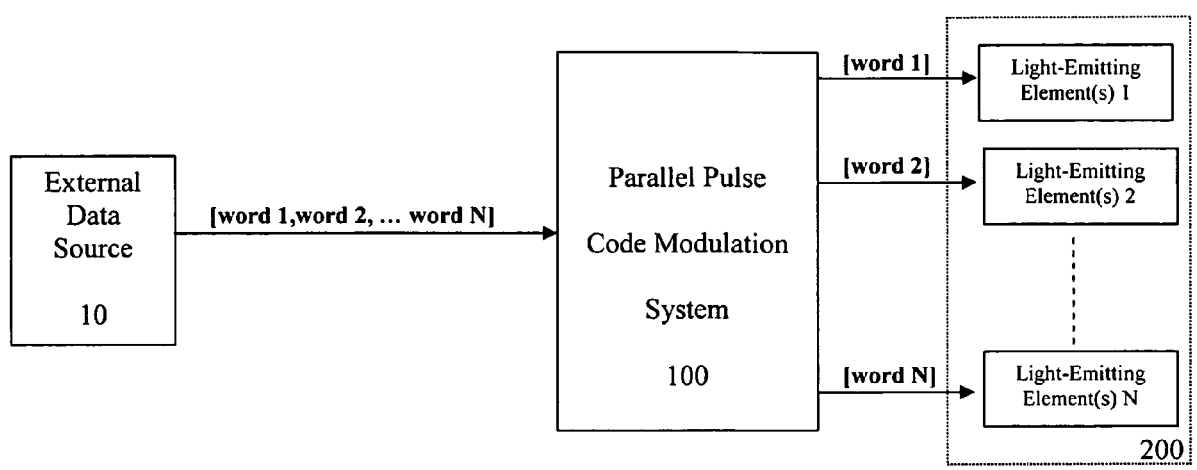
FIG. 3 illustrates a high level schematic of one embodiment of the present invention.

A high level schematic of the present invention is illustrated in FIG. 3. The parallel pulse code modulation system 100 according to the present invention enables independent control of a multiplicity of light-emitting elements such as semiconductor or organic light-emitting diodes (LEDs) or groups thereof, using control signals from a source while reducing the number of interconnections between the source and the drivers of light-emitting elements. In this manner, control of a plurality of light-emitting elements or groups thereof can be achieved without a need for a multilayer printed circuit board.

In one embodiment of the present invention, the parallel pulse code modulation system 100 receives N words of binary data from an external source 10, such as a microcontroller, a host computer, or a digital communications system, where N is the number of light-emitting elements or groups of elements 200 to be controlled. The data is then converted into parallel bit streams, wherein one bit stream is sent to each light-emitting element, thereby enabling each of the N light-emitting elements to be controlled. Each of the N words comprises M bits of binary data, wherein each M bits of data together represent a desired intensity level for a particular light-emitting element of group of light-emitting elements.

Figure 4:
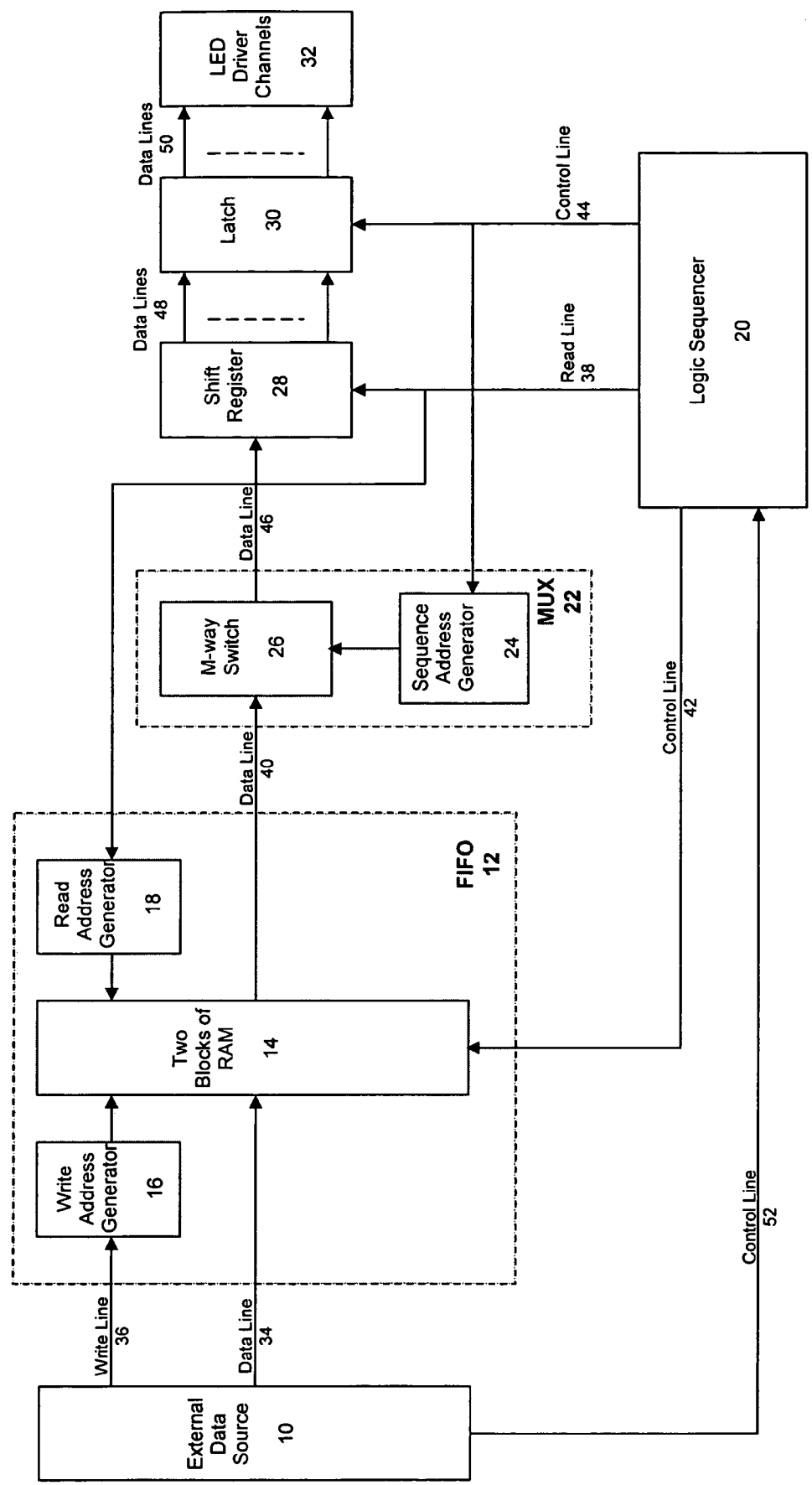
FIG. 4 illustrates a block diagram of one embodiment of the present invention.

FIG. 4 illustrates one embodiment of the present invention, wherein the N words from the external source control N LED driver channels. The N words are received by a first-in-first-out memory (FIFO) 12, where each M-bit word received by the FIFO is a binary representation of the luminous intensity of a particular LED or LED group driven by a particular LED driver channel.

In this embodiment, the FIFO memory 12 comprises at least two blocks of dual-ported random-access memory (RAM) 14, each able to store N words of M bits each. Sequential write address generator 16 and sequential read address generator 18, identify the words to be written to or output from the RAM 14, respectively. As each word of data is received by FIFO 12 from the external data source 10 through data line 34, write line 36 is pulsed by the external data source 10. This action results in the writing of the word data to the currently addressed RAM location and increments the write address generator 16 modulo 2N to address the next RAM location for the subsequent word data to be written.

The contents of RAM 14 can be read asynchronously while the RAM is being written to. Upon toggling of read line 38 by the logic sequencer 20, the read address generator 18 is incremented modulo N to address the next RAM location and the word data stored at this location is output on data line 40.

In operation, N words of data are repeatedly received by FIFO 12 at a rate of P times a second, where P can be between 100 and 300 thereby providing a means for smooth adjustment of the illumination intensity of the light-emitting elements without visual perception of flickering, for example. Each repetition of this receipt of N words is hereinafter referred to as a "cycle."

As indicated, 2N words of M-bit data may be received by FIFO 12 and stored in dual-ported RAM 14 at any time. Therefore, the reading of the data stored in RAM 14 is delayed by one cycle with respect to the data being written to the RAM by the external data source 10. In this manner, the data related to the current cycle may be read asynchronously with respect to the data being written for the next cycle. That is, the contents of RAM locations 1 through N may be read while the contents of RAM locations N+1 through 2N are being written to on each even cycle, and vice versa on each odd cycle, for example. In addition, logic sequencer 20 toggles control line 42 to determine whether the first or second block of RAM 14 is accessed. FIFO 12 therefore fulfils an additional task of buffering the data received from external data source 10. In addition, repeated activation of read line 38 by the logic sequencer 20 allows the contents of dual-ported RAM 14 to be read multiple times in the order in which the data was received.

The output of FIFO 12 is connected to the input of an M:1 digital multiplexer (MUX) 22, which organizes the word data read from the FIFO 12 into a serial bit stream. MUX 22 comprises a sequential address generator 24 and an M-way switch 26. The logic sequencer 20 is connected to address generator 24 through control line 44. Toggling of control line 44 by logic sequencer 20 decrements address generator 24 modulo M. Depending on the address presented by address generator 24 to M-way switch 26, the output of MUX 22 is bit 1 through bit M of the current input word.

The output of MUX 22 is connected by data line 46 to the input of an N-bit serial-to-parallel shift register 28, which shifts the bits through itself and thus essentially holds the $M^{th}$ bit of each word as they come in from MUX 22 and outputs them in parallel format. A multiplicity of shift registers may also be used with a combined capacity of N bits as described in a following embodiment. Logic sequencer 20 is connected to shift register 28 through read line 38 to provide a clock signal that is pulsed to sequentially shift the bits of each word through the register.

The N digital outputs of shift register 28 are connected by data lines 48 to the N inputs of N-bit latch 30, which holds the data it receives from the shift register until the next set of data is received. Logic sequencer 20 is connected to latch 30 through control line 44, which pulses to enable latch 30 to receive each bit through data lines 48. The N outputs of latch 30 are connected to N LED drivers 32 through data lines 50 thereby activating or deactivating each LED driver to which an LED or group of LEDs is connected.

Logic Sequence and Timing

The logic sequencer 20 essentially determines the sequence and time at which events as defined according to the present invention take place. It comprises a programmable timer that can be synchronized by the external data source 10 through control line 52. This line is pulsed at the start of each cycle. External data source 10 then sequentially outputs N words to FIFO 12 at the rate of P times per second, subject to the constraint that all N words are output prior to the start of the next cycle. This constraint thereby results in a limit being applied to the number of words that are in each cycle, while this value is also dependent on the speed of the clock associated with the system.

At the beginning of each cycle (after the first cycle during which the first N words have been written to FIFO 12), logic sequencer 20 repeatedly pulses read line 38 to sequentially transfer N words from FIFO 12 to MUX 22. In one embodiment of the present invention where bit angle modulation (BAM) is realized, address generator 24 is set to select the most significant bit of each word. The $M^{th}$ bit of each word is output to shift register 28. Control line 42 is set to access the appropriate block of RAM 14, which for the second cycle would be set to access block one, for example. As read line 38 is pulsed, it also pulses the clock of shift register 28 to sequentially shift the bits through the register. Once shift register 28 contains the first bit of each of the N words to be output, logic sequencer 20 pulses control line 44 to enable latch 30 to receive each bit through data lines 48. These bits are then output to LED drivers 32 through data lines 50. Toggling of control line 44 also increments MUX address generator 24 at the same time to select the next most significant bit. Therefore, if bit M is the most significant bit, bits M of every word are followed by bits M-1, M-2, and so on, for example, wherein bit M-1 is the most significant bit subsequent to bit M.

In the embodiment of the present invention in which BAM is realized, and having regard to the most significant bit, the time of logic sequencer 20 is programmed to delay pulsing of control line 44 for a period of 1/(2P). Thus, the most significant bit is essentially stretched by this period. During this delay time logic sequencer 20 again repeatedly pulses read line 38 to sequentially transfer N words from FIFO 12 to MUX 22. Upon timer expiry of this delay time, logic sequencer 20 again pulses control line 44 to latch the bits and output them to LED drivers 32.

This process is performed M times, with the timer delay period being halved each time so that each bit is stretched by a ratio defining the value of the required intensity. Thus, with BAM, the time of logic sequencer 20 is programmed to delay for a period of $(1/(2^i * P))$, wherein "i" is equivalent to the significance of the bit, for example "i" equal to 1 is the most significant bit in a word and "i" equal to 2 is the second most significant bit in a word. As such for the second most significant bit the delay is equivalent to 1/(4P). Thus, the N words received from external data source 10 are converted into BAM bit streams for transmission to each LED driver.

Upon the completion of the selection and transmission of the last bit in each word through shift register 28 to the latch 30 and on to LED drivers 32, a first cycle has been completed. Control line 42 is then toggled to select an alternate block of RAM 14 comprising the N words for the subsequent cycle in preparatory to repeating the entire aforementioned process during this next cycle.

Figure 5:
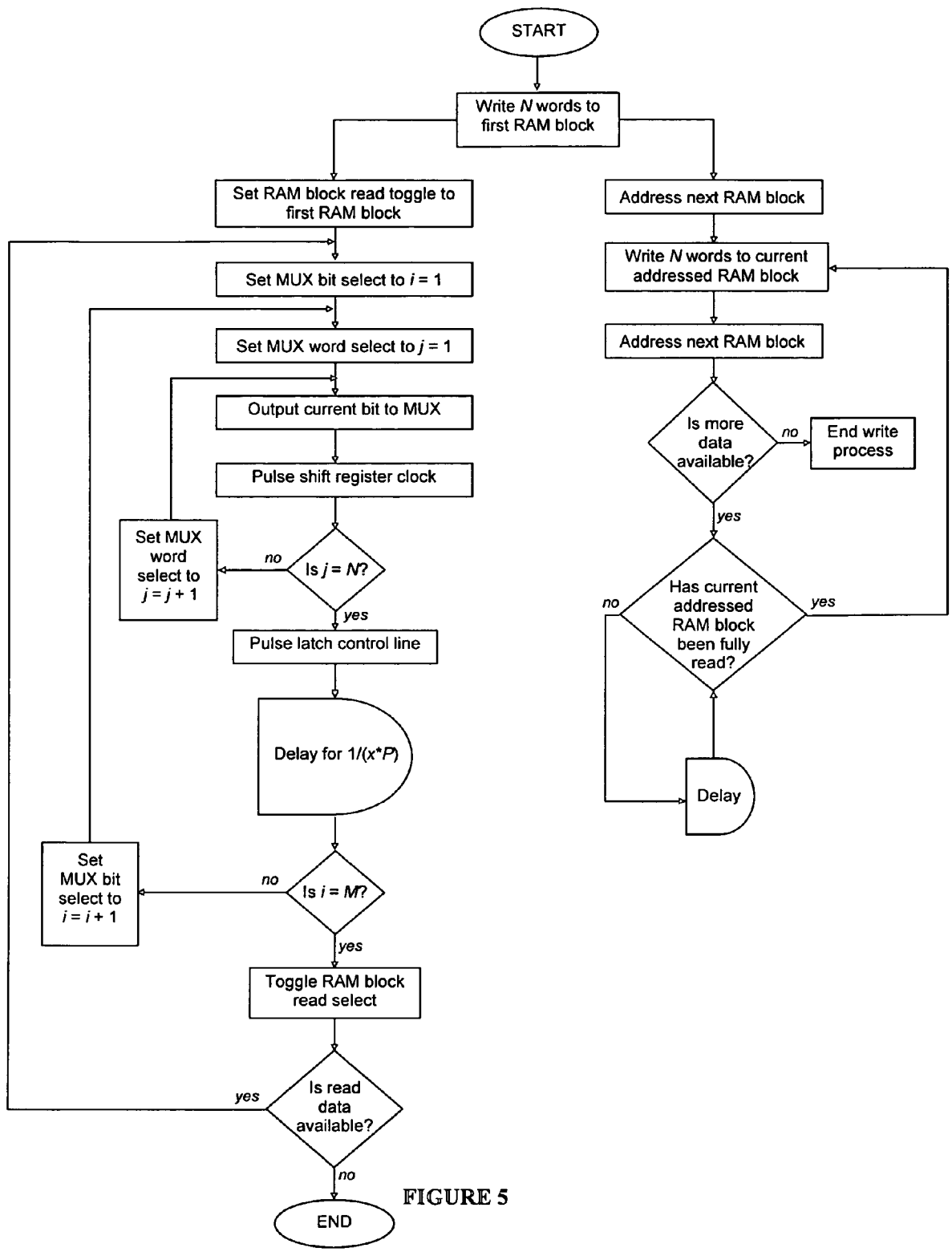
FIG. 5 illustrates the process flow for one embodiment of the present invention

FIG. 5 schematically illustrates the process flow for the above embodiment of the present invention. The value of "x" determines the period of delay of each control bit and is equal to $2^i$ in the case of BAM, however if PCM is being used "x" can be a constant.

In addition, as an example, the above process can be defined using pseudocode and would be described as follows:

```
DO FOREVER
    Read N words data into FIFO 12
    Set MUX 22 bit select address to M
    FOR i = 1 to M
        FOR j = 1 to N
            Output data[j] from FIFO 12 to MUX 22
            Pulse shift register 28 clock
        ENDFOR
        Pulse latch 30
        Decrement MUX 22 bit select address
        Delay 1/(x * P) seconds
    ENDFOR
    Toggle RAM 14 block select
ENDDO
```

As described above, in one embodiment of the present invention the timing and sequence is controlled such that the LED channels are driven using BAM, however the invention may be used to translate any stream of binary words into a parallel output stream in order to control individual light-emitting elements or groups of light-emitting elements, with a possibility of stretching each bit of data if desired.

Figure 6:
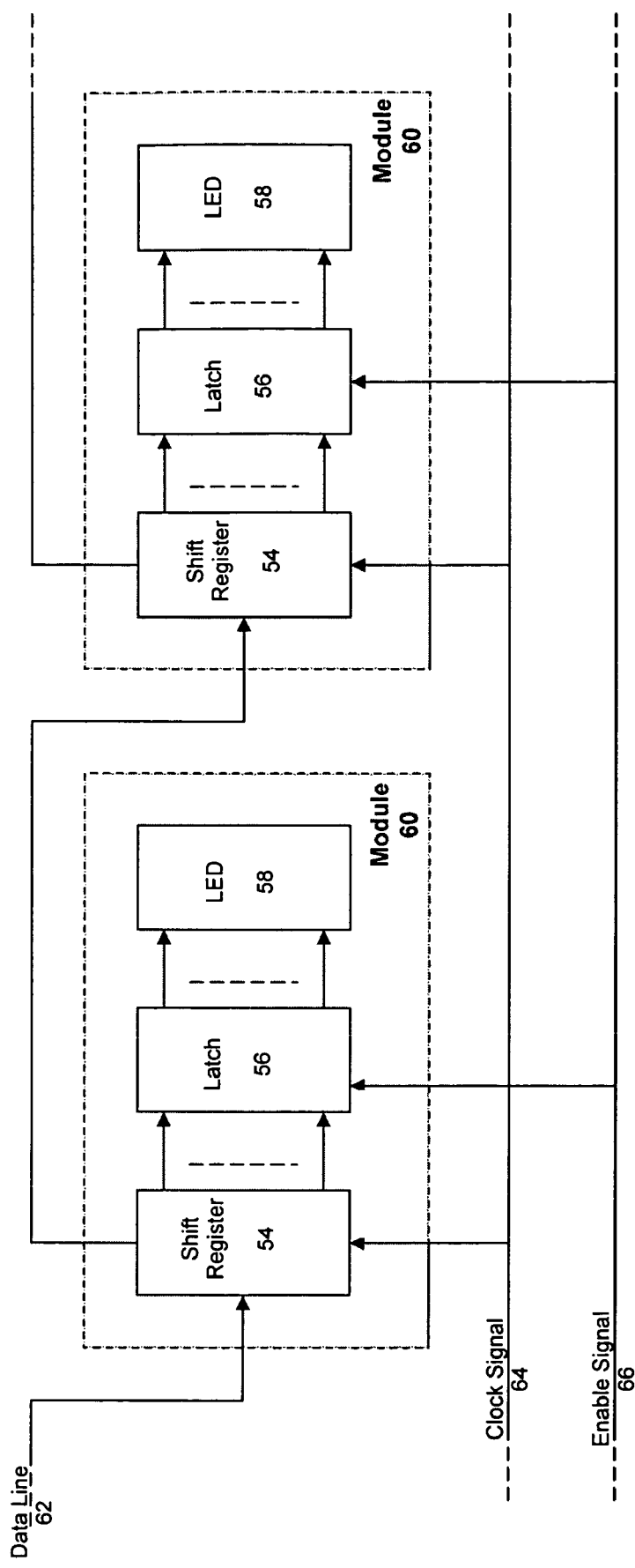
FIG. 6 illustrates a block diagram of another embodiment of the present invention.

In one embodiment of the present invention, as shown in FIG. 6, a multiplicity of each of shift registers 54 and latches 56 can be associated with LED drivers 58 such that these components have a combined capacity of N bits. In this configuration each shift register, latch and associated LED drivers can be located as independent modules 60 with a daisychained serial data connection 62, a common shift register clock signal 64, and a common latch enable signal 66 connecting each of the multiplicity of modules 60.

An advantage of the present invention is that the shift registers and associated latches may be physically separated from FIFO 12, MUX 22, and logic sequencer 20. Whereas a PWM controller requires N separate connections for each LED driver channel, the invention requires only three connections between each shift register and associated latch, wherein these connections are the data input line 46 to the shift register, the read line 38 from the logic sequencer and latch enable signal 44 from the logic sequencer. The present invention thereby can avoid the need for expensive multilayer circuit boards as would typically be required for PWM based controllers.

Another advantage of the present invention is that each of the logical subunits, including the FIFO, MUX, shift registers, latches and the logic sequencer, can be implemented using discrete integrated circuits or less expensive FPGAs or application-specific integrated circuits (ASICs) with low gate counts as opposed to, for example, more expensive microcontrollers.

A further advantage of the present invention is that the lower circuit complexity enables the logical subunits to be operated at switching speeds and cycle times that may exceed those achievable by commercial microcontrollers. It may therefore be possible to independently control hundreds of LED driver channels with a single instance of the present invention.

While the above description is described as it may be applied to the activation of light-emitting elements, a worker skilled in the art would readily understand that the present invention provides a means for activating/deactivating a plurality of electronic devices using pulses, while reducing the number of connections between the source and the electronic device themselves.

The embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A parallel pulse code modulation system enabling independent control of a plurality of groups of one or more electronic devices, the system comprising:
    a memory unit for writing control data from an external source thereto and reading the control data therefrom;
    a multiplexer connected to the memory unit for receiving the control data from the memory unit and organizing the control data into a serial data stream comprising groups of data;
    a shift register connected to the multiplexer, the shift register receiving the serial data stream from the multiplexer and translating each group of data into parallel pulse code modulated data stream outputs, each of the parallel pulse code modulated data stream outputs representing control parameters for a particular group of one or more electronic devices;
    a latch connected to the shift register and to the plurality of groups of one or more electronic devices, the latch receiving each of the parallel pulse code modulated data stream outputs and sending a single particular parallel pulse code modulated data stream output to a corresponding group of one or more electronic devices, thereby providing independent control of the plurality of groups of one or more electronic devices; and
    a logic sequencer for providing sequencing and timing signals to the memory unit, the multiplexer, the shift register and the latch, thereby controlling actions and timing thereof.

2. The parallel pulse code modulation system according to claim 1, wherein the control data comprises a plurality of binary words, wherein each of the binary words comprises a plurality of binary data bits defining a desired level of operation of the particular group of one or more electronic devices.

3. The parallel pulse code modulation system according to claim 2, wherein the electronic devices are light-emitting elements and the desired level of operation is representative of a desired illumination level.

4. The parallel pulse code modulation system according to claim 1, wherein the memory unit is a first-in-first-out memory.

5. The parallel pulse code modulation system according to claim 1, wherein the memory unit is a dual-ported random-access memory that can be written to and read from simultaneously.

6. The parallel pulse code modulation system according to claim 2, wherein the multiplexer organizes the plurality of binary words into the serial data stream based on significance of the binary data bits in each of the binary words.

7. The parallel pulse code modulation system according to claim 6, wherein the binary words are organized into the serial data stream based on decreasing significance of the binary data bit in each of the binary words.

8. The parallel pulse code modulation system according to claim 1, wherein each parallel pulse code modulated data stream output comprises a plurality of binary data bits, wherein sending the single particular pulse code modulated parallel data stream output to the corresponding group of one or more electronic devices further comprises placing a delay of a predetermined time period between each successive binary bit.

9. The parallel pulse code modulation system according to claim 8, wherein the predetermined time period is sequentially reduced after sending each binary bit in the parallel pulse code modulated data stream output, wherein the predetermined output is reset for sending of a subsequent parallel pulse code modulated data stream output.

10. The parallel pulse code modulation system according to claim 8, wherein the binary data bits have an assigned significance, wherein the predetermined time period is based on the assigned significance of a particular binary data bit.

11. The parallel pulse code modulation system according to claim 10, wherein the predetermined time period is divided by two after sending of each binary data bit in the particular parallel pulse code modulated data stream output.

12. The parallel pulse code modulation system according to claim 1,
    wherein the shift register is connected in a daisy chain to a plurality of additional shift registers,
    wherein each shift register is connected to a corresponding latch and each latch is connected to a corresponding plurality of groups of one or more electronic devices, and
    wherein the serial data stream output by the multiplexer is sequentially transmitted to each shift register.

13. An electronic-circuit-implemented method for enabling independent control of a plurality of groups of one or more electronic devices, the method comprising the steps of:
    writing control data from an external source to a memory unit;
    reading the control data from the memory unit and transmitting the control data to a multiplexer;

organizing the control data into a serial data stream comprising groups of data, by the multiplexer;

transforming each group of data into a plurality of parallel pulse code modulated data stream outputs, by a shift register connected to the multiplexer, each of the parallel pulse code modulated data stream outputs representing control parameters for a particular group of one or more electronic devices;

transmitting a single particular parallel pulse code modulated data stream output to a corresponding group of one or more electronic devices, by a latch connected to the shift register and to the plurality of groups of one or more electronic devices, thereby providing independent control of the plurality of groups of one or more electronic devices; and providing sequencing and timing signals to the memory unit, the multiplexer, the shift register and the latch by a logic sequencer, thereby controlling actions and timing thereof.

14. The method according to claim 13, wherein the control data comprises a plurality of binary words, wherein each of the binary words comprises a plurality of binary data bits defining a desired level of operation of a particular group of one or more electronic devices.

15. The method according to claim 14, wherein the electronic devices are light-emitting elements and the desired level of operation is representative of a desired illumination level.

16. The method according to claim 13, wherein writing the control data to the memory unit and reading the control data from the memory unit are performed simultaneously.

17. The method according to claim 14, wherein the step of organizing the control data comprises organizing the plurality of binary words into the serial data stream based on significance of the binary data bits in each of the binary words.

18. The method according to claim 17, wherein the binary words are organized into the serial data stream based on decreasing significance of the binary data bits in each of the binary words.

19. The method according to claim 13, wherein each parallel bit stream output comprises a plurality of binary data bits, wherein the step of transmitting each parallel pulse code modulated data stream output comprises a delay of a predetermined time period between transmission of each binary data bit.

20. The method according to claim 19, wherein the predetermined time period is sequentially reduced after transmission of each binary data bit in the parallel pulse code modulated data stream out put, wherein the predetermined output is reset for transmission for a subsequent parallel pulse code modulated data stream output.

21. The method according to claim 19, wherein the binary data bits have an assigned significance, wherein the predetermined time period is based on the significance of a particular binary data bit.

22. The method according to claim 20, wherein the predetermined time period is divided by two after transmission of each binary data bit in the parallel pulse code modulated data stream output.

* * * * *